(12) United States Patent
Sibley et al.

(10) Patent No.: US 12,314,155 B2
(45) Date of Patent: May 27, 2025

(54) RULE ENGINE FOR FUNCTIONAL SAFETY CERTIFICATION

(71) Applicant: RED HAT, INC., Raleigh, NC (US)

(72) Inventors: Rachel Elizabeth Sibley, Raleigh, NC (US); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 227 days.

(21) Appl. No.: 18/305,799

(22) Filed: Apr. 24, 2023

(65) Prior Publication Data

US 2024/0354230 A1  Oct. 24, 2024

(51) Int. Cl.
G06F 11/3668  (2025.01)

(52) U.S. Cl.
CPC ...... *G06F 11/3676* (2013.01); *G06F 11/3684* (2013.01); *G06F 2201/81* (2013.01)

(58) Field of Classification Search
CPC ............. G06F 11/3676; G06F 11/3684; G06F 2201/81
USPC ...................................................... 717/124
See application file for complete search history.

(56) References Cited

U.S. PATENT DOCUMENTS

| | | | | |
|---|---|---|---|---|
| 8,756,049 B2 * | 6/2014 | Proctor | ............... | G06F 11/3672 717/124 |
| 9,547,737 B2 * | 1/2017 | Vincelli | ................... | G06F 30/30 |
| 10,248,492 B2 * | 4/2019 | Mariani | ................. | G06F 11/079 |
| 11,181,870 B2 * | 11/2021 | Bivans | ..................... | G05B 9/02 |
| 11,354,956 B2 * | 6/2022 | Ufkes | ................. | G07C 9/00571 |
| 11,390,301 B2 | 7/2022 | Hari et al. | | |
| 11,876,782 B2 * | 1/2024 | Miele | .................. | H04L 63/1425 |
| 11,947,331 B2 * | 4/2024 | Bivans | ................. | G05B 19/406 |
| 2009/0077532 A1 * | 3/2009 | Denney | ............... | G06F 11/3692 717/125 |
| 2020/0065234 A1 | 2/2020 | Letombe et al. | | |

FOREIGN PATENT DOCUMENTS

DE           102020215387 A1     6/2022

OTHER PUBLICATIONS

Denney et al., "A Software Safety Certification Tool for Automatically Generated Guidance, Navigation and Control Code", 2008, IEEE, pp. 1-11. (Year: 2008).*
Oracle, "Working with the Rules Engine", 2016, Oracle and/or its affiliates, pp. 1-188. (Year: 2016).*

(Continued)

*Primary Examiner* — Ted T. Vo
(74) *Attorney, Agent, or Firm* — Kilpatrick Townsend & Stockton LLP (57) ABSTRACT

Functions associated with functional safety certification of a software package can be identified using a rule engine. For example, a computing system can identify the functions in a codebase of the software package by executing the rule engine that is configured to identify the functions using a rule set. In response to identifying the functions, the computing system can tag the functions with a function identifier usable to filter the codebase to define a subset of the codebase consisting of the functions. The computing system can execute a targeted test suite to generate a code coverage report of the codebase such that the targeted test suite is limited to the subset of the codebase based on the function identifier.

20 Claims, 3 Drawing Sheets

(56) References Cited

OTHER PUBLICATIONS

Anonymous, "ISO 26262 Software Compliance in the Automotive Industry," Parasoft, 2023 Parasoft, retrieved Feb. 23, 2023: pp. 1-66, <https://alm.parasoft.com/hubfs/ISO26262-Software-Compliance-Automotive.pdf>.

Anonymous, "Squish Coco—Part III About Code Coverage Code Coverage Measurement for TCL, QML, C# and C/C ++," Frog Logic, 2003-2011 Sébastien Fricker, 2011-2022 The Qt Company, retrieved Feb. 23, 2023: pp. 1-22, <https://doc.froglogic.com/squish-coco/latest/codecoverage.html>.

Alcaide et al., "Safety-Related Challenges and Opportunities for GPUs in the Automative Domain," IEEE Micro, vol. 38(6), Oct. 9, 2018: pp. 46-55.

Bardin et al., "Test Case Generation with PathCrawler/LTest: How to Automate an Industrial Testing Process," Leveraging Applications of Formal Methods, Nov. 5, 2018: pp. 1-15, <http://pathcrawler-online.com:8080/pubs/isola 18.pdf>.

Fève, HAL-02272246: "Automatic Safety mechanisms implementation in Software Model-Based Development," HAL Open Science, Embedded Real Time Software and Systems, Feb. 2014: pp. 1-8, <https://hal.science/hal-02272246/>.

\* cited by examiner

302
Identify a plurality of functions in a codebase of a software package by executing a rule engine configured to identify the plurality of functions using a rule set, the plurality of functions being associated with a functional safety certification of the software package

304
In response to identifying the plurality of functions, tagging the plurality of functions with a function identifier, the function identifier being usable to filter the codebase to define a subset of the codebase consisting of the plurality of functions

306
Executing a targeted test suite to generate a code coverage report of the codebase, the targeted test suite being limited to the subset of the codebase based on the function identifier

*FIG. 3*

RULE ENGINE FOR FUNCTIONAL SAFETY CERTIFICATION

TECHNICAL FIELD

The present disclosure relates generally to software deployment and evaluation. More specifically, but not by way of limitation, this disclosure relates to a rule engine for functional safety certification.

BACKGROUND

Many organizations around the globe have developed functional safety standards for software and electronics. Functional safety relates to reducing risks so that computing systems function safely in the event that there is an electrical or electronic malfunction. One example of a functional safety standard is ISO 26262, defined by the International Organization for Standardization® (ISO) for automotive electronics. Another example of a standard is ISO/IEC 62304. Functional safety standards can be used to avoid or mitigate systematic failures and hardware failures to prevent hazardous operational situations.

A system can be certified to a functional safety standard based on a particular Safety Integrity Level (SIL) that defines a target level of risk reduction. For example, an Automotive Safety Integrity Level (ASIL) assignment with respect to ISO 26262 for a system has four possible levels of safety requirements: ASIL A, ASIL B, ASIL C, and ASIL D. ASIL D has the highest safety requirements of the four possible levels and includes the safety requirements of the three preceding levels.

DETAILED DESCRIPTION

A software developer or software development organization may want or need to comply with a functional safety standard issued by a standard-setting organization when developing a software package for end users. A software package can include programs and files that are bundled together to serve a common purpose. To determine compliance of the software package with a functional safety standard, the software developer can test the software package, for example to determine a code coverage value of the software package. But, a subset of the software package that is relevant to accreditation of the functional safety standard may be relatively small compared to the overall software package. Testing the overall software package can waste computing resources by testing portions of the software package that are unrelated to the accreditation of the functional safety standard. Additionally, testing the overall software package can result in false positive errors with respect to indicating confidence in the software package.

Some examples of the present disclosure can overcome one or more of the issues mentioned above by using a rule engine to identify functions associated with functional safety certification. Once the rule engine identifies these functions, a computing system including the rule engine can tag these functions with a function identifier. Using the function identifier, the computing system can test a subset of the software package that is related or relevant to the functional safety certification, enabling the computing system to conserve computing resources. The computing system then can generate a code coverage report that includes statistics or data associated with code that is being executed during testing. This code coverage report can be used to improve upon the testing of the software package, such as with respect to obtaining the functional safety certification.

If a code coverage value of the code coverage report is below a predetermined threshold, the computing system may prevent execution, deployment, or release of the software package. To increase the code coverage value to meet or exceed the predetermined threshold, the computing system may use the code coverage report to identify gaps in test coverage with respect to the subset of software package. The computing system may modify an existing test suite to address these gaps and retest the software package using the modified test suite.

In one particular example, the computing system can execute a rule engine that uses a rule set to identify one or more functions in a codebase of a software package that include exception handlers. These functions can be relevant to a functional safety certification of the software package due to an exception handler being present to handle an anomalous event that disrupts a typical flow of the software package. Once the rule engine identifies the functions, the computing system can use metadata as a function identifier to tag each function of the functions such that the computing system can define a subset of the codebase using the function identifier.

The computing system then can execute a targeted test suite that is limited to the subset of the codebase including functions corresponding to exception handlers. For instance, the targeted test suite may include mocking or stubbing. A code coverage report generated by executing the targeted test suite can include a code coverage value indicating a degree of execution corresponding to the exception handlers of the codebase. If this code coverage value is below a predetermined threshold, the computing system may modify the targeted test suite to increase the code coverage value, for instance by adding additional tests that address gaps in the targeted test suite.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
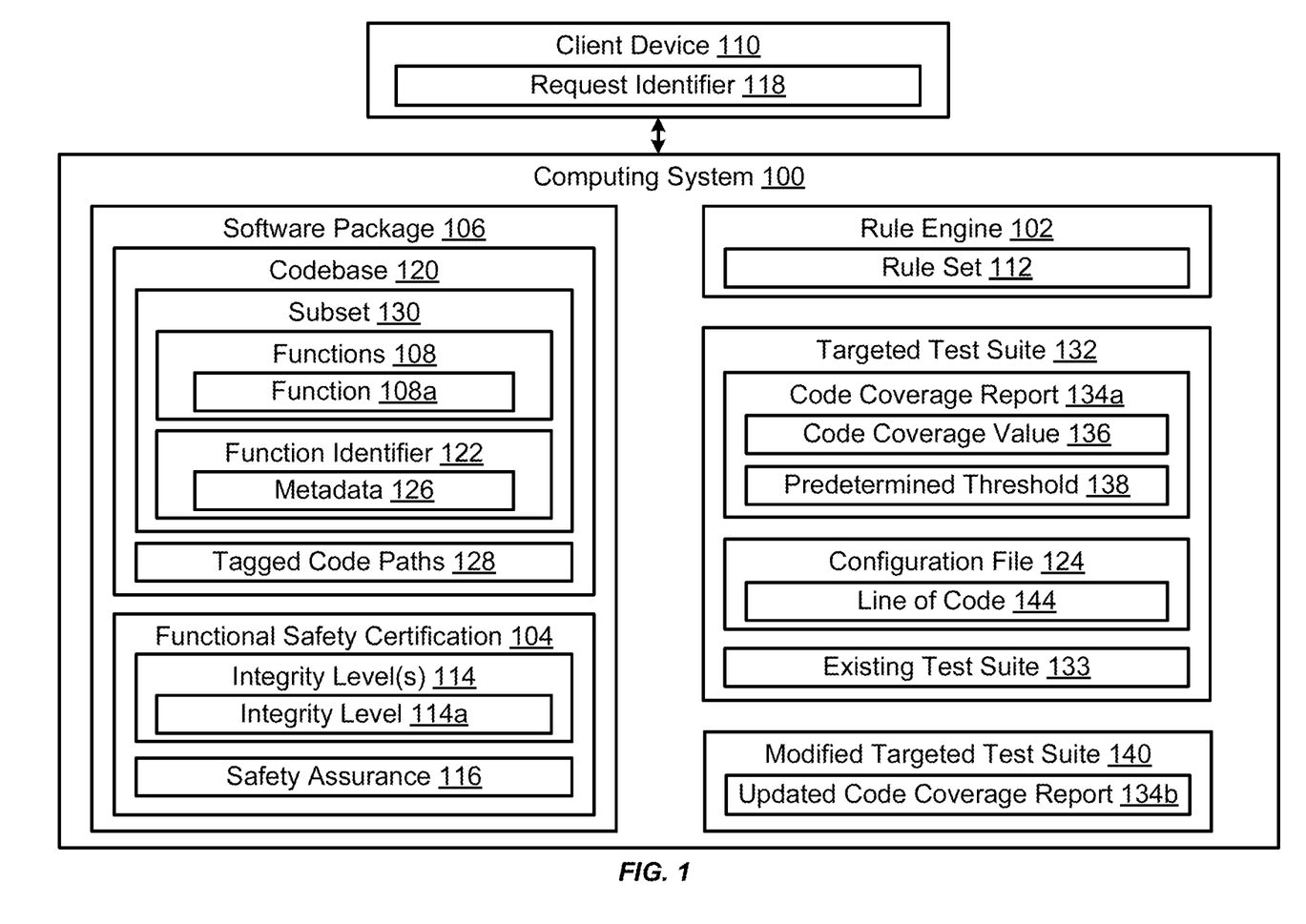
FIG. 1 is a block diagram of an example of a computing system for using a rule engine for functional safety certification according to one example of the present disclosure.

FIG. 1 is a block diagram of an example of a computing system 100 for using a rule engine 102 for functional safety certification 104 according to one example of the present disclosure. The functional safety certification 104 can represent an attestation or confirmation with respect to a software package 106 conforming to one or more safety standards. The functional safety certification 104 may be overseen by a regulatory authority (e.g., International Organization for Standardization (ISO), International Electrotechnical Commission (IEC), etc.). Examples of the functional safety certification 104 associated with transportation can include ISO 26262 for road vehicles, ISO 25119 for machinery associated with agriculture and forestry, and ISO 15998 for earth-moving machinery. Medical applications of the functional safety certification 104 may include IEC 60601 for medical devices or IEC 62304 for medical device software. Additionally, compliance-related policies (e.g., the Health Insurance Portability and Accountability Act (HIPAA), etc.) may involve a similar certification with respect to safety.

Components within the computing system 100 may be communicatively coupled via a network, such as a local area network (LAN), wide area network (WAN), the Internet, or any combination thereof. For example, the computing system 100 can be communicatively coupled to a client device 110 through the network. Examples of the computing system 100 can include a desktop computer, laptop computer, server, mobile phone, or tablet.

The rule engine 102 can identify functions 108 (e.g., application programming interface (API) calls) of the software package 106 that are associated with the functional safety certification 104. In some examples, the rule engine 102 used can be stored in the computing system 100. Alternatively, the rule engine 102 may be positioned external to the computing system 100, for example in the client device 110. The rule engine 102 can include at least one rule set 112 used to identify the functions 108 associated with the functional safety certification 104. For example, the rule set 112 may involve identifying functions 108 associated with linkage during compilation, interrupt request handlers, exception handlers, or defining API calls.

In some examples, the functional safety certification 104 can be classified using an integrity level selected from one or more integrity level(s) 114 that have varying rigor associated with safety assurance 116 of the functional safety certification 104. For example, a first integrity level (e.g., integrity level 114a) may build upon a second integrity level such that the first integrity level includes additional safety requirements that improve upon the safety assurance 116 of the software package 106. If the functional safety certification 104 is associated with multiple integrity levels 114, the rule engine 102 may include a respective rule set for each integrity level 114. In such examples, the computing system 100 can select a suitable rule set associated with the integrity level 114 that is used by the rule engine 102 to identify the functions 108.

The rule set 112 used to identify the functions 108 may be provided to the rule engine 102 by a client, for example via the client device 110 communicatively coupled to the computing system 100. Additionally or alternatively, the client may provide a request identifier 118 (e.g., identifying an interrupt request (IRQ) handler, exception handler, API call, etc.) usable to identify the functions 108 associated with the functional safety certification 104. As an illustrative example, if the integrity level 114a selected for the software package 106 is ASIL B, the computing system 100 may use a request identifier 118 corresponding to API calls associated with ASIL B to create the rule set 112. Once created, the rule set 112 then can be stored in the rule engine 102 for subsequent use to identify the functions 108. Applying the rule set 112 can involve searching a codebase 120 of the software package 106 using the request identifier 118 to identify the functions 108 of the codebase 120 that include the request identifier 118. The codebase 120 can represent a collection of source code used to build the software package 106.

Once the rule engine 102 identifies the functions 108, the computing system 100 may tag each function of the functions 108 with a function identifier 122 indicating an association with the applicable integrity level (e.g., integrity level 114a) or the functional safety certification 104. For example, the computing system 100 may tag each API call associated with the integrity level 114a of ASIL B with the function identifier 122 corresponding to ASIL B such that the API calls can be collectively identified using the function identifier 122. In some examples, the computing system 100 may apply the function identifier 122 in a configuration file 124 associated with the codebase 120. Additionally or alternatively, the computing system 100 may define the function identifier 122 in metadata 126 associated with each function of the functions 108. For example, the computing system 100 may use annotations (e.g., comments) within the codebase 120 to define the function identifier 122 of the functions 108. Using the function identifier 122, the computing system 100 can modify the codebase 120 to create one or more tagged code paths 128 in the codebase 120 that are usable to identify a subset 130 of the codebase 120.

The computing system 100 may test the software package 106 prior to deployment or a production release to the client device 110 to ensure that the software package 106 includes minimal vulnerabilities (e.g., bugs, unpatched code, etc.). To test the software package 106, the computing system 100 can execute a targeted test suite 132 specified to test the subset 130 of the software package 106 relevant to the functional safety certification 104. For example, if the functional safety certification 104 of the software package 106 is associated with an integrity level 114a of ASIL B, the computing system 100 may limit the targeted test suite 132 to the functions 108 corresponding to ASIL B. In some examples, the computing system 100 can create the targeted test suite 132 by updating an existing test suite 133 using the configuration file 124 that identifies the functions 108 associated with the functional safety certification 104. Additionally or alternatively, the targeted test suite 132 may include mocking or stubbing that limit dependencies of the functions 108 such that testing focuses on the source code in the codebase 120. For example, the functions 108 identified using the function identifier 122 that are relevant to the functional safety certification 104 may be stubbed out in the targeted test suite 132. Other portions of the software package 106 that are not included in the subset 130 may not be tested by the targeted test suite 132, since these portions may not be relevant to the functional safety certification 104. Limiting a scope of the targeted test suite 132 enables the computing system 100 to conserve computing resources (e.g., RAM, storage, threads, etc.) by testing the subset 130 instead of testing the overall software package 106. Additionally, testing the subset 130 can shorten time taken to complete software testing by running fewer tests using the targeted test suite 132 compared to testing the entire codebase 120.

A code coverage report 134a (e.g., an HTML report) can be generated and output in response to executing the targeted test suite 132. The code coverage report 134a can include a code coverage value 136 (e.g., a percentage, decimal, etc.) corresponding to the subset 130 of the software package 106. The code coverage value 136 can represent a degree to which the codebase 120 or a particular function of the codebase 120 is executed when running the targeted test suite 132. The code coverage value 136 being higher than another code coverage value can indicate that the subset 130 of the software package 106 corresponding to the code coverage value 136 has more of the codebase 120 being executed during testing. Additionally, a code coverage value 136 that is relatively high (e.g., 80%) may indicate that the subset 130 of the software package 106 is less likely to contain undetected vulnerabilities compared to another subset of a software package with a relatively low code coverage value (e.g., 5%). Limiting the targeted test suite 132 to the subset 130 of the codebase 120 pertaining to the functional safety certification 104 can improve validity of the code coverage value 136 with respect to the functional safety certification 104 and minimize false positive errors.

In some examples, the code coverage report 134a may indicate directories and files that constitute the codebase 120 of the software package 106. By restricting the targeted test suite 132 to the subset 130 of the codebase 120, the computing system 100 can conserve computing resources with respect to generating and using the code coverage report 134a. For example, instead of searching through portions of a general code coverage report that are irrelevant to the subset 130, the computing system 100 can search through the code coverage report 134a that has been limited by the function identifier 122.

Additionally, the computing system 100 may prevent the software package 106 from being deployed or released until the code coverage value 136 of the subset 130 meets or exceeds a predetermined threshold 138. If the computing system 100 determines that the code coverage value 136 of the subset 130 is below the predetermined threshold 138, the computing system 100 can prevent the software package 106 from being transmitted to the client device 110. In such examples, the computing system 100 then can use the code coverage report 134a to identify a function 108a of the functions 108 associated with the code coverage value 136 being below the predetermined threshold 138. For example, the code coverage report 134a may indicate that a code coverage value 136 of the function 108a is 60%, suggesting that a specific branch in the codebase 120 was skipped. Accordingly, the computing system 100 may modify testing conditions to improve the code coverage value 136 corresponding to the subset 130 of the codebase 120.

Specifically, once the computing system 100 identifies the function 108a, the computing system 100 can modify the targeted test suite 132 to create a modified targeted test suite 140 that generates an updated code coverage report 134b. Modifying the targeted test suite 132 may increase the code coverage value 136 associated with the function 108a, such as by adding a test to the targeted test suite 132 to address this specific branch that was skipped. The computing system 100 may generate a configuration file 124 that identifies the functions 108 of the codebase 120 that are tagged with the function identifier 122. Additionally, the configuration file 124 can indicate a respective line of code 144 of the codebase 120 that corresponds to each function of the functions 108. By inputting this configuration file 124 to the targeted test suite 132, the computing system 100 can create the modified targeted test suite 140 that is adjusted to improve the code coverage value 136 compared to the targeted test suite 132.

In some examples, the computing system 100 may modify the targeted test suite 132 to create the modified targeted test suite 140. Alternatively, instead of modifying the targeted test suite 132, the computing system 100 may modify an existing test suite 133 different from the targeted test suite 132 that is usable to test the codebase 120 of the software package 106. For example, compared to the targeted test suite 132, the existing test suite 133 may require fewer modifications to improve the code coverage value 136 of the subset 130. The computing system 100 may repeat this modification process until the code coverage value 136 of the subset 130 of the codebase 120 meets or exceeds the predetermined threshold 138. Increasing the code coverage value 136 to meet or exceed the predetermined threshold 138 can improve a likelihood of attaining the functional safety certification 104 due to a larger percentage of relevant code in the codebase 120 being tested. Additionally, once the code coverage value 136 meets or exceeds the predetermined threshold 138, the computing system 100 can enable deployment or release of the software package 106, for example to the client device 110.

While FIG. 1 depicts a specific arrangement of components, other examples can include more components, fewer components, different components, or a different arrangement of the components shown in FIG. 1. For instance, in other examples, the rule engine 102 may be positioned external to the computing system 100. Additionally, any component or combination of components depicted in FIG. 1 can be used to implement the process(es) described herein.

Figure 2:
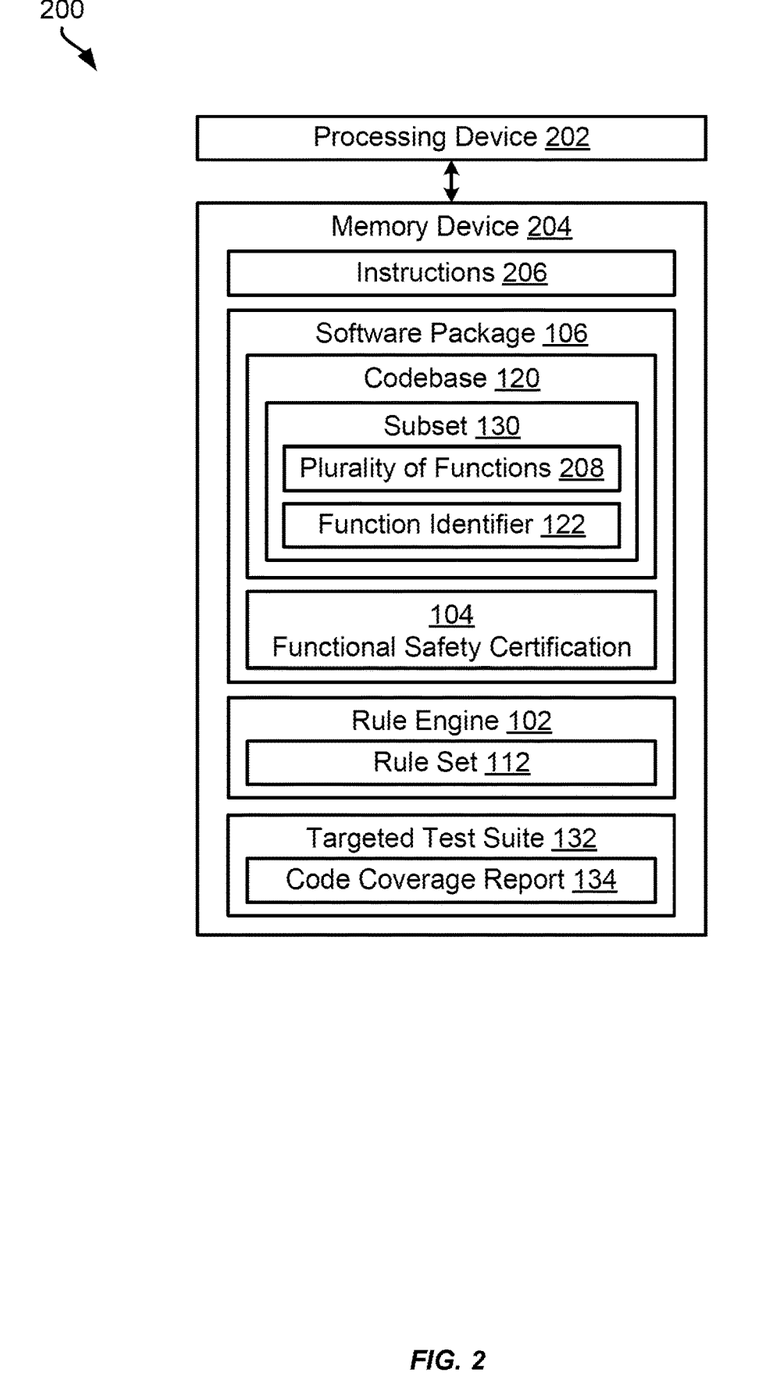
FIG. 2 is a block diagram of an example of a computing environment for using a rule engine for functional safety certification according to one example of the present disclosure.

FIG. 2 is a block diagram of an example of a computing environment 200 for using a rule engine 102 for functional safety certification 104 according to one example of the present disclosure. Once identified, the functions 108 can be tagged with a function identifier 122 that can be used to restrict testing to only the functions 108. The computing environment 200 can include a processing device 202 communicatively coupled to a memory device 204.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code executable to perform operations. Non-limiting examples of a computer-readable medium include magnetic disk(s), memory chip(s), ROM, random-access memory (RAM), an ASIC, a configured processor, and optical storage.

In some examples, the processing device 202 can execute the instructions 206 to perform operations. For example, the processing device 202 can execute a rule engine 102 to identify a plurality of functions 208 (e.g., the functions 108 of FIG. 1) in a codebase 120 of a software package 106. The plurality of functions 208 may be identified by the rule engine 102 using a rule set 112 created at least in part by a developer or provided by a client. Additionally, the plurality of functions 208 can be associated with a functional safety certification 104 of the software package 106 that can indicate a degree of confidence in the software package 106 with respect to safety.

Once the processing device 202 identifies the plurality of functions 208, the processing device 202 can use a function identifier 122 to tag the plurality of functions 208. Using this function identifier 122, the processing device 202 can filter the codebase 120 to define a subset 130 of the codebase 120 consisting of the plurality of functions 208. Based on the subset 130 of the codebase 120, the processing device 202 can execute a targeted test suite 132 to generate a code coverage report 134 of the codebase 120. The code coverage report 134 can indicate what percentage of the subset 130 of the codebase 120 has been executed by the targeted test suite 132. By limiting the targeted test suite 132 to the subset 130 of the codebase 120 relevant to the function safety certification 104, the code coverage report 134 can provide more granular results compared to testing the entire codebase 120. Additionally, with the subset 130 of the codebase 120 being smaller than the entire codebase 120, testing the subset 130 can result in faster testing execution compared to testing the entire codebase 120.

Figure 3:
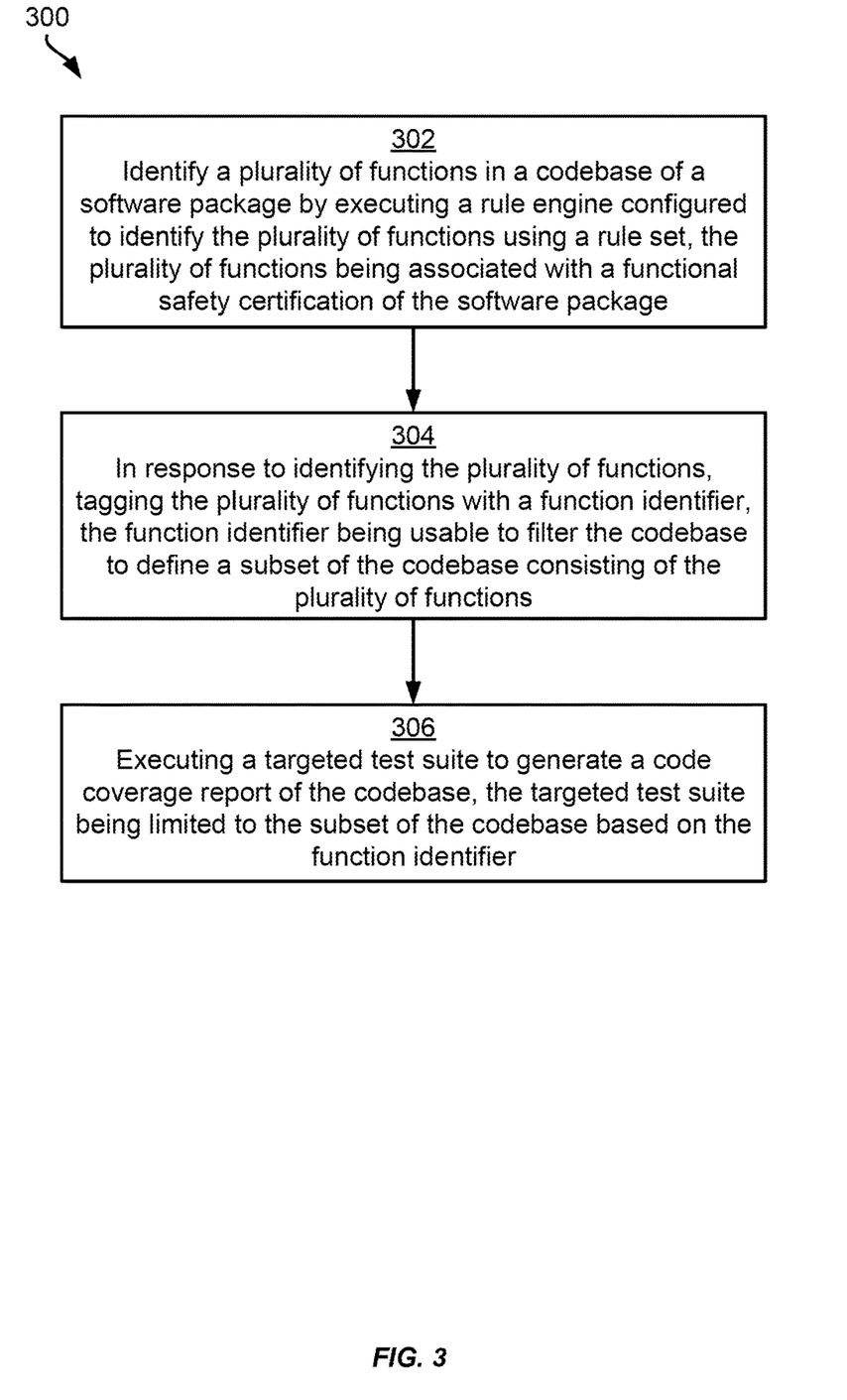
FIG. 3 is a flowchart of a process for using a rule engine for functional safety certification according to one example of the present disclosure.

FIG. 3 is a flowchart of a process 300 for using a rule engine 102 for functional safety certification 104 according to one example of the present disclosure. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 identifies a plurality of functions 208 in a codebase 120 of a software package 106 by executing a rule engine 102 configured to identify the plurality of functions 208 using a rule set 112. The plurality of functions 208 may be associated with a functional safety certification 104 of the software package 106. In some examples, the rule set 112 may be provided to the processing device 202 by a developer, client, administrator, or another suitable authorized personnel. Additionally or alternatively, the processing device 202 may execute an artificial intelligence (AI) module trained to analyze the codebase 120 using a machine-learning model to identify the plurality of functions 208. For example, the AI module may be trained based on pattern matching to identify the plurality of functions 208.

In block 304, in response to identifying the plurality of functions 208, the processing device 202 tags the plurality of functions 208 with a function identifier 122. For example, the processing device 202 can use annotations or comments as the function identifier 122 used to tag the plurality of functions 208. The function identifier 122 can be used to filter the codebase 120 to define a subset 130 of the codebase 120 consisting of the plurality of functions 208. For example, the processing device 202 can use the function identifier 122 to modify the codebase 120 and generate a plurality of tagged code paths 128 in the codebase 120. These tagged code paths 128 can be used to identify the subset 130 of the codebase 120, enabling tailored testing of the codebase 120 with a scope limited to the plurality of functions 208.

In examples in which the functional safety certification 104 includes more than one integrity level 114, the processing device 202 may identify a separate plurality of functions for each integrity level 114. The processing device 202 then can tag each separate plurality of functions with a different function identifier such that the processing device 202 can relatively efficiently determine which separate plurality of functions to test. As an illustrative example, if the functional safety certification 104 is ISO 26262, the functional safety certification 104 can include four automotive safety integrity levels (ASILs) as the integrity levels 114. The processing device 202 can tag each of the four ASILs with a different function identifier such that the processing device 202 can switch between which of the four ASILs to focus testing with respect to the software package 106.

In block 306, the processing device 202 executes a targeted test suite 132 to generate a code coverage report 134a of the codebase 120. The targeted test suite 132 may be limited to the subset 130 of the codebase 120 based on the function identifier 122. For example, if the function identifier 122 corresponds to an integrity level 114a of ASIL B, the processing device 202 can use the function identifier 122 to limit testing of the software package 106 to the plurality of functions 208 relevant to ASIL B. This can provide more detailed results tailored to the plurality of functions 208 relevant to ASIL B compared to testing the entire software package 106. Based on a code coverage value 136 of the code coverage report 134a that corresponds to the subset 130, the processing device 202 may prevent the software package 106 from being transmitted to a client device 110, for example for deployment. Specifically, if the code coverage value 136 of the subset 130 is below a predetermined threshold 138, the processing device 202 can block deployment or release of the software package 106.

In some examples, the processing device 202 may modify the targeted test suite 132 based on a same function of the plurality of functions 208 that is lowering the code coverage value 136 of the subset 130 associated with the functional safety certification 104. Alternatively, the processing device 202 may modify a different function of the plurality of functions 208 based on the code coverage report 134a of a previous test suite. For example, the processing device 202 may modify the targeted test suite 132 based on function A in response to determining that function A is lowering the code coverage value 136. After generating an updated code coverage report 134b by executing the modified targeted test suite 140, the processing device 202 may determine that function B is now lowering the code coverage value 136 of the subset 130 of the codebase 120. Accordingly, the processing device 202 then can further modify the modified targeted test suite 140 based on function B.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
 a processing device; and
 a memory device including instructions that are executable by the processing device for causing the processing device to perform operations comprising:
  identifying a plurality of functions in a codebase of a software package by executing a rule engine configured to identify the plurality of functions using a rule set, the plurality of functions being associated with a functional safety certification of the software package;
  in response to identifying the plurality of functions, tagging the plurality of functions with a function identifier, the function identifier being usable to filter the codebase to define a subset of the codebase consisting of the plurality of functions; and executing a targeted test suite to generate a code coverage report of the codebase, the targeted test suite being limited to the subset of the codebase based on the function identifier.

2. The system of claim 1, wherein the operations further comprise, subsequent to generating the code coverage report of the codebase:

determining that a code coverage value of the code coverage report is below a predetermined threshold; and in response to determining that the code coverage value is below the predetermined threshold, preventing the software package from being transmitted to a client device.

3. The system of claim 2, wherein the operations further comprise, subsequent to executing the targeted test suite:

identifying, based on the code coverage report, a function of the plurality of functions that is associated with the code coverage value below the predetermined threshold;

in response to identifying the function, modifying the targeted test suite to increase the code coverage value associated with the function; and executing the modified targeted test suite to generate an updated code coverage report.

4. The system of claim 1, wherein tagging the plurality of functions further comprises:

defining the function identifier in metadata associated with each function of the plurality of functions; and modifying the codebase using the function identifier to generate a plurality of tagged code paths in the codebase, wherein the plurality of tagged code paths are usable to identify the subset of the codebase.

5. The system of claim 1, wherein the functional safety certification is classified using an integrity level selected from one or more integrity levels with varying rigor associated with safety assurance of the functional safety certification, and wherein the function identifier corresponds to the integrity level selected for the functional safety certification of the software package.

6. The system of claim 1, wherein executing the targeted test suite further comprises:

generating a configuration file identifying the plurality of functions tagged with the function identifier in the codebase, wherein the configuration file indicates a respective line of code corresponding to each function of the plurality of functions; and executing the targeted test suite based on an existing test suite with a code coverage value below a predetermined threshold, wherein the targeted test suite is generated by updating the existing test suite using the configuration file.

7. The system of claim 1, wherein the operations further comprise, prior to detecting the plurality of functions:

receiving a request identifier from a client device wherein the request identifier is usable to identify the plurality of functions associated with the functional safety certification; and identifying the plurality of functions associated with the functional safety certification by searching the codebase using the request identifier.

8. A method comprising:

identifying a plurality of functions in a codebase of a software package by executing a rule engine configured to identify the plurality of functions using a rule set, the plurality of functions being associated with a functional safety certification of the software package;

in response to identifying the plurality of functions, tagging the plurality of functions with a function identifier, the function identifier being usable to filter the codebase to define a subset of the codebase consisting of the plurality of functions; and executing a targeted test suite to generate a code coverage report of the codebase, the targeted test suite being limited to the subset of the codebase based on the function identifier.

9. The method of claim 8, further comprising, subsequent to generating the code coverage report of the codebase:

determining that a code coverage value of the code coverage report is below a predetermined threshold; and in response to determining that the code coverage value is below the predetermined threshold, preventing the software package from being transmitted to a client device.

10. The method of claim 9, further comprising, subsequent to executing the targeted test suite:

identifying, based on the code coverage report, a function of the plurality of functions that is associated with the code coverage value below the predetermined threshold;

in response to identifying the function, modifying the targeted test suite to increase the code coverage value associated with the function; and executing the modified targeted test suite to generate an updated code coverage report.

11. The method of claim 8, wherein tagging the plurality of functions further comprises:

defining the function identifier in metadata associated with each function of the plurality of functions; and modifying the codebase using the function identifier to generate a plurality of tagged code paths in the codebase, wherein the plurality of tagged code paths are usable to identify the subset of the codebase.

12. The method of claim 8, wherein the functional safety certification is classified using an integrity level selected from one or more integrity levels with varying rigor associated with safety assurance of the functional safety certification, and wherein the function identifier corresponds to the integrity level selected for the functional safety certification of the software package.

13. The method of claim 8, wherein executing the targeted test suite further comprises:

generating a configuration file identifying the plurality of functions tagged with the function identifier in the codebase, wherein the configuration file indicates a respective line of code corresponding to each function of the plurality of functions; and executing the targeted test suite based on an existing test suite with a code coverage value below a predetermined threshold, wherein the targeted test suite is generated by updating the existing test suite using the configuration file.

14. The method of claim 8, further comprising, prior to detecting the plurality of functions:

receiving a request identifier from a client device wherein the request identifier is usable to identify the plurality of functions associated with the functional safety certification; and identifying the plurality of functions associated with the functional safety certification by searching the codebase using the request identifier.

15. A non-transitory computer-readable medium comprising program code executable by a processing device for causing the processing device to perform operations comprising:
- identifying a plurality of functions in a codebase of a software package by executing a rule engine configured to identify the plurality of functions using a rule set, the plurality of functions being associated with a functional safety certification of the software package;
- in response to identifying the plurality of functions, tagging the plurality of functions with a function identifier, the function identifier being usable to filter the codebase to define a subset of the codebase consisting of the plurality of functions; and
- executing a targeted test suite to generate a code coverage report of the codebase, the targeted test suite being limited to the subset of the codebase based on the function identifier.

16. The non-transitory computer-readable medium of claim 15, wherein the operations further comprise, subsequent to generating the code coverage report of the codebase:
- determining that a code coverage value of the code coverage report is below a predetermined threshold; and
- in response to determining that the code coverage value is below the predetermined threshold, preventing the software package from being transmitted to a client device.

17. The non-transitory computer-readable medium of claim 16, wherein the operations further comprise, subsequent to executing the targeted test suite:
- identifying, based on the code coverage report, a function of the plurality of functions that is associated with the code coverage value below the predetermined threshold;
- in response to identifying the function, modifying the targeted test suite to increase the code coverage value associated with the function; and
- executing the modified targeted test suite to generate an updated code coverage report.

18. The non-transitory computer-readable medium of claim 15, wherein tagging the plurality of functions further comprises:
- defining the function identifier in metadata associated with each function of the plurality of functions; and
- modifying the codebase using the function identifier to generate a plurality of tagged code paths in the codebase, wherein the plurality of tagged code paths are usable to identify the subset of the codebase.

19. The non-transitory computer-readable medium of claim 15, wherein the functional safety certification is classified using an integrity level selected from one or more integrity levels with varying rigor associated with safety assurance of the functional safety certification, and wherein the function identifier corresponds to the integrity level selected for the functional safety certification of the software package.

20. The non-transitory computer-readable medium of claim 15, wherein executing the targeted test suite further comprises:
- generating a configuration file identifying the plurality of functions tagged with the function identifier in the codebase, wherein the configuration file indicates a respective line of code corresponding to each function of the plurality of functions; and
- executing the targeted test suite based on an existing test suite with a code coverage value below a predetermined threshold, wherein the targeted test suite is generated by updating the existing test suite using the configuration file.

\* \* \* \* \*